(12) United States Patent
Dietrich (10) Patent No.: US 11,428,389 B2
(45) Date of Patent: Aug. 30, 2022

(54) FIXTURE FOR A LAMP, AND LIGHTING ELEMENT

(71) Applicant: SCHOTT AG, Mainz (DE)

(72) Inventor: Andreas Dietrich, Guldental (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/255,686

(22) Filed: Jan. 23, 2019

(65) Prior Publication Data

US 2019/0226667 A1 Jul. 25, 2019

(30) Foreign Application Priority Data

Jan. 23, 2018 (DE) ...................... 10 2018 101 384.1

(51) Int. Cl.
| | |
|---|---|
| F21V 21/30 | (2006.01) |
| F21V 21/04 | (2006.01) |
| B60Q 3/51 | (2017.01) |
| B60Q 3/44 | (2017.01) |
| B60Q 3/76 | (2017.01) |
| B64D 11/00 | (2006.01) |

(52) U.S. Cl.
CPC ............... *F21V 21/30* (2013.01); *B60Q 3/44* (2017.02); *B60Q 3/51* (2017.02); *B60Q 3/76* (2017.02); *F21V 21/041* (2013.01); *F21V 21/044* (2013.01); *F21V 21/047* (2013.01); *B64D 2011/0053* (2013.01)

(58) Field of Classification Search
CPC .. B60Q 3/74; B60Q 3/51; F21V 17/18; F21V 21/047
See application file for complete search history.

(56) References Cited

U.S. PATENT DOCUMENTS

| | | | | |
|---|---|---|---|---|
| 4,514,794 | A * | 4/1985 | Haberthur-Heilig ... | G03B 15/03 362/16 |
| 5,757,136 | A | 5/1998 | Schadhauser | |
| 8,029,161 | B2 * | 10/2011 | Ono ........................ | B60Q 3/44 362/269 |
| 8,602,614 | B2 * | 12/2013 | Schultheis ............... | B60Q 3/82 362/275 |
| 10,364,951 | B2 * | 7/2019 | McMillan ............... | F21S 8/026 |
| 2005/0174791 | A1 | 8/2005 | Bynum | |
| 2005/0264047 | A1 | 12/2005 | Bauer | |
| 2015/0078013 | A1 * | 3/2015 | Vogt ......................... | F21K 9/20 362/373 |

(Continued)

FOREIGN PATENT DOCUMENTS

| | | |
|---|---|---|
| DE | 849459 | 9/1952 |
| DE | 3227167 | 1/1984 |
| DE | 19504405 | 8/1996 |

(Continued)

*Primary Examiner* — William J Carter
(74) *Attorney, Agent, or Firm* — Ruggiero McAllister & McMahon LLC (57) ABSTRACT

A fixture for a lamp and to a lighting element are provided that is usable as a reading light, for example in a vehicle or aircraft. The fixture is adapted to be releasably installed in an opening of an accommodating element and includes a cylindrical mounting element having a lateral wall, a front side, and an opposite rear side. The front side has an opening for receiving the lamp. The lateral wall has a radially outwardly projecting rib and a radially outwardly projecting latching element.

19 Claims, 6 Drawing Sheets

(56) References Cited

U.S. PATENT DOCUMENTS

2016/0262240 A1    9/2016   Woelfing
2017/0299154 A1   10/2017  Ortega Garcia

FOREIGN PATENT DOCUMENTS

| | | | |
|---|---|---|---|
| DE | 19512130 | 10/1996 | |
| DE | 202004005794 | 8/2005 | |
| DE | 202013100276 | 2/2013 | |
| DE | 102014013103 | 3/2015 | |
| DE | 202015106675 | 1/2016 | |
| DE | 102014110993 | 2/2016 | |
| DE | 102015103332 | 9/2016 | |
| DE | 202017102157 | 5/2017 | |
| EP | 1600375 | 10/2008 | |
| EP | 2312200 | 4/2011 | |
| EP | 2541126 | 1/2013 | |
| KR | 200103867 A * | 5/2001 | ............... B60Q 3/51 |
| KR | 100926772 | 11/2009 | |

* cited by examiner

FIXTURE FOR A LAMP, AND LIGHTING ELEMENT

CROSS REFERENCE TO RELATED APPLICATIONS

This application claims benefit under 35 USC 119 of German Application 10 2018 101 384.1 filed Jan. 23, 2018, the entire contents of which are incorporated herein by reference.

BACKGROUND

1. Field of the Invention

The present invention generally relates to a fixture for a lamp and to a lighting element. More particularly, the invention relates to a lighting element which can be used as a reading light, for example in a vehicle or aircraft.

2. Description of Related Art

The market for lighting means and consequently also that for lamps and lighting assemblies is subject to rapid technological development. Thus, there are constantly new fields of application for lighting means in their current stage of development. In this context, light emitting diodes (LEDs) are in particular worth mentioning, whose latest developments offer new fields of application, for example in the automotive or aviation sectors.

Especially in the aviation sector, requirements are particularly high, since there is usually little space available for the lights, and moreover there exist high safety requirements, for example in terms of attachment. Currently, there are various efforts to use LED lights in the environment of cabin lighting of commercial aircraft.

Various uses are possible in this environment. On the one hand, the large-area cabin interior lighting can be mentioned, which has hitherto mainly been provided using conventional light panels. For such interior lighting which is subject to high requirements in terms of constant brightness, there are approaches to be replaced by LED lights, as is described in published document DE 10 2015 103 332 A1, for example.

A specialty are lights which are intended to be used as reading lights in commercial aircraft, for example. Because of the rather unfavorable lighting conditions for reading in commercial aircraft in which airline passenger seats are arranged in line and reading lights are provided on the cabin canopy thereabove, combined passenger seats have been developed which are each equipped with their own reading light. Such an aircraft passenger seat is described, for example, in EP 1 600 375 B1. Typically, such lights are mounted to the seat structure with a plurality of screws, so that installation and removal thereof is time-consuming. For removal it is not only necessary to have the right tool to hand, but it is also necessary to take special care with respect to the fastening elements so that they are not lost. In addition, the fastening by means of multiple screws is associated with a rather high expenditure of time and moreover requires the attachment of a covering for hiding the screws.

SUMMARY

It has been determined by the present application that the conditions as to the space available are often even less favorable here than for the general interior cabin lighting. This is compounded by the fact that the possibility of removal must be guaranteed, for repair and maintenance works. In addition to preventing unintentional loosening, moreover unintentional loss of fastening elements during removal should preferably be prevented, because of the high safety requirements in the aviation sector. For example, a small screw that is lost during removal might cause considerable damage, for example when it falls into openings or shafts in the aircraft floor, where it may unintentionally block movements or even cause a short circuit.

What is desirable, therefore, is a fixture for a lamp and a lighting element based thereon, which can be easily and safely installed and removed. The lighting element shall preferably be useful as a reading light.

In particular the use of additional fastening elements such as screws should be avoided for this purpose. Furthermore, the special rules that apply in the aviation sector should be complied with, so as to allow for use in commercial aircraft, for example.

Furthermore, both installation and removal should be feasible easily and quickly, and installation shall preferably be possible without tools. Moreover, removal shall be possible non-destructively, in order to carry out repairs easily.

The inventors have addressed this objective.

Accordingly, the invention relates to a fixture for a lamp. The fixture is configured for being releasably mounted in an opening of an accommodating element, preferably in a circular opening of an accommodating element.

For this purpose, the fixture may comprise a circular-cylindrical mounting element having a lateral wall, a front side and an opposite rear side. The mounting element preferably has the shape of a straight circular cylinder. In the installed state, the front side faces the user, the rear side faces away from the user.

Particularly favorably, the front side can have an opening for receiving and holding a lamp. A lighting element according to the invention may accordingly comprise the fixture and a lamp mounted in the fixture. In a particularly preferred embodiment, the lighting element is designed as a reading light.

The mounting element may therefore have approximately the basic shape of a straight circular cylinder that is open at one end. For attachment to the accommodating element, the lateral wall may have at least one elongated rib arranged on the outer surface and projecting radially outwards. Furthermore, it is contemplated that at least one latching element is provided on the outer surface of the lateral wall projecting radially outwards.

This proposed inventive connection of the fixture to the accommodating element, comprising at least one rib and at least one latching element, makes it possible in a surprisingly simple way to provide a fixture for a lighting element, which is very easily installed and removed on the one hand, but on the other hand also exhibits protection against unwanted loosening.

The at least one rib of the mounting element in cooperation with a precisely complementary opening in the accommodating element is effective in a way similar to a bayonet closure. Such attachment is characterized by a connection between a cylindrical mounting element and an accommodating element, which can be established and released rapidly, wherein the fixture according to the invention can be firmly connected with the accommodating element by being nested or introduced into the opening and then rotated, and can be released again by being rotated in the opposite direction.

Once the fixture has been introduced and rotated, that is in a final installed position and therefore in the intended installation state, the additional latching element can engage in a corresponding precisely complementary recess in the opening of the accommodating element and thus cause a further positively fitting connection.

This is an essential requirement for use in the aviation sector, where purely frictional connections are not preferred.

Preferably, the opening of the accommodating element provided for the installation of the fixture has a shape precisely complementary to the arrangement of the rib and the latching element. Therefore, the opening of the accommodating element may have appropriate recesses or pockets for receiving the at least one rib and the latching element.

For a particularly simple installation, the lateral wall may have a partially or completely circumferential collar on the front side, which protrudes radially beyond the outer surface of the lateral wall. In one embodiment, this collar may define an abutment surface to the accommodating element thereby geometrically limiting axial insertion of the fixture into the opening. In addition to or instead of the collar, in a further embodiment, the lateral wall may also be formed with a step-shaped projection which defines an axial abutment surface to the accommodating element in the installed state and limits axial insertion.

In the case of a completely circumferential collar it is moreover possible to prevent the ingress of foreign particles into the gap resulting between the circular opening of the accommodating element and the mounting element in the installed state. The outer surface of the collar may vary in design thereby taking account of various design aspects.

In order to further facilitate insertion into the opening, the outer surface of the lateral wall may be slightly conical, with a cross section tapering towards the rear side.

In a preferred embodiment, the outer surface of the lateral wall has a further rib, that means a total of two ribs projecting radially outwards, which are preferably arranged tangentially spaced from each other. In this way, the connection can be made to be mechanically very stable and jam-proof. Preferably in this case, the two ribs are distributed over a circumferential section of more than 180 degrees.

Particularly preferably, the two ribs are arranged opposite to each other on the outer surface of the lateral wall. This also promotes straight insertion of the fixture into the opening of the accommodating element, since jamming can be prevented.

It is also possible to provide more than two ribs, for example three or four ribs, which may then be arranged tangentially spaced from each other over the circumferential section. However, it is important to ensure that on the one hand there is still a sufficient spacing between the individual ribs, which allows insertion into the opening, and that on the other hand appropriate overlapping is achieved between the ribs and lands provided between the recesses of the opening of the accommodating element after the rotation, in order to establish a mechanically stable attachment by virtue of the overlap.

Preferably, the ribs are arranged tangentially to the central axis, so that they have their longitudinal or largest dimension extending parallel to a section perpendicular to the central axis of the mounting element. It is also possible to form the ribs like a helix with a slight inclination, similar to a thread. In the case of at least two ribs, at least these two ribs or all ribs that are provided may have an identical length.

In a further embodiment, in the case at least two ribs are provided, at least two ribs are formed to have a different length. With an appropriate design of the recesses in the opening of the accommodating element, it can be ensured particularly easily in this way that, for installation, insertion of the fixture into the opening is possible only in a single predetermined orientation. If the fixture is formed with more than two ribs, it is generally sufficient if one of the ribs has a length differing from the length of the remaining ribs and the recess in the opening is adapted accordingly.

On the one hand, the ribs are intended to ensure a mechanically stable hold in the installed state, that is to say they provide sufficiently high resistance for the fixture against being pulled out of the opening of the accommodating element. On the other hand, they should not be too large in height, so that the opening in the accommodating element need not be sized excessively large. Therefore, the at least one rib may have a height between 0.1 and 15 mm, preferably between 0.2 and 5 mm, measured with respect to the outer surface of the lateral wall.

The length of the ribs, i.e. their tangential dimension relative to the central axis, depends on the total number of ribs. Generally, it may be beneficial to make the ribs longer if only a few ribs are provided, and shorter if more than one rib is provided. Care should be taken here to achieve a stable positive connection by a rather long overlapping range in the installed state.

It has proved to be advantageous if the ribs extend tangentially to the central axis over an angle between 5° and 65°, preferably between 10° and 60°, and most preferably between 15° and 55°. The angular range resulting from the total of overlapping ranges of the ribs effective in the installed state of the fixture can preferably be in a range between 10° and 180°, more preferably between 20° and 150°.

The latching element is preferably arranged in a circumferential section on the outer surface of the lateral wall in a portion which has no rib. This separation of functions makes it possible to ensure simple installation on the one hand and a stable and reliable fit of the fixture in the opening in the installed state on the other hand.

In the final installed position, i.e. upon completion of rotation of the fixture in the opening of the accommodating element, the latching element can then engage into a further precisely fitting recess of the accommodating element. In this way, a rotation opposite to the installation direction of rotation after installation and thereby unintentional loosening can be prevented.

The proposed attachment between fixture and accommodating element therefore comprises two complementary positively fitting connections that are effective in two different directions. For unlocking, such as for repair or maintenance works, the latching element can be unlocked, and the unlocking can be done in a particularly simple manner by applying a force in the direction of the central axis of the fixture. Accordingly, the latching element can be moved a short distance toward the rear for being released, i.e. towards the rear side as seen from the operator, which makes the unlocking particularly easy.

In an advantageous embodiment, the mounting element comprises a further resilient element as a tolerance compensation against radial clearance in the final installed position. In the installed state, it may be operatively related to the inner wall of the opening of the accommodating element when the latching element is engaged. This is advantageous because the mounting element may be formed with a small undersize relative to the diameter of the opening, for easier insertion. The tolerance compensation is preferably arranged on the mounting element in a manner so that it is provided opposite the latching element.

The latching element and the resilient element may be arranged on the rear side of the fixture or may be formed as part of a rear wall, for example. In addition, further openings or recesses may be provided on the back, of course, such as a passage opening for a connection element, for example for passing a connection cable.

Furthermore, a recess may be provided on the rear side extending between the passage opening for the connection cable and the lateral wall, for receiving and/or guiding the connection cable, which is routed, for example, from a lamp arranged in the opening of the mounting element through the passage opening of the rear side to the outside.

This recess may have a depth and/or width of about 2 to 4 mm for this purpose, which makes it possible to use common four-wire connection cables, for example. In the installed position, the recess may face downwards so that identical cable routing is always possible in the installed state, regardless of the direction of rotation.

In a particularly preferred embodiment, the fixture is designed so that a small installation depth is achieved, that is to say a small dimension along the longitudinal axis. This is not trivial, since the fixture shall allow the accommodation and support of a lamp in the opening of the mounting element on the one hand, and also the corresponding electrical connections, and on the other hand shall be mounted reliably and firmly in the opening of the accommodating element.

The combination of the bayonet-type connection and the latching element as well as the arrangement of the associated components according to the invention makes it possible in a surprisingly simple way to define this maximum extent along the central axis so that the fixture has a length of not more than 1 inch (=2.54 cm). It is even possible to reduce this dimension to a maximum of ¾ inch (=1.9 cm) and most preferably to not more than ½ inch (=1.27 cm). This small dimension opens up many installation options, for example directly in a headrest or neck support of an airliner passenger seat.

Furthermore within the scope of the invention is a lighting element which comprises a fixture as discussed above and a lamp preferably mounted therein. The lighting element may be employed in the field of passenger transport, in particular in the automotive or aviation sector, in a train, in a ship, in the field of architecture, or as interior or exterior lighting. With an appropriate design of the lamp, the lighting element is particularly useful as a reading light.

The lighting element according to the invention allows for releasable installation in an opening of an accommodating element, preferably in a circular opening having a shape exactly complementary to the fixture.

For example, the light can be equipped with modern lamps based on LED technology. Other common lamps are possible as well, of course, but there may be restrictions in terms of a desired small installation depth here.

Furthermore, the invention comprises an accommodating element, in particular a panel which is mounted, for example, in the interior of a commercial aircraft and thus forms part of a cabin interior covering, or of a seat, in particular an airline passenger seat, having a circular opening which is formed to be able to accommodate the lighting element of the invention.

The lighting element can be mounted in the opening of the accommodating element so that, for example, an individual reading light for an airline passenger can be implemented in a simple way when mounted in the head region of an airline passenger seat. Therefore, a panel, a seat, or an airline passenger seat comprising a lighting element according to the invention is also within the scope of the invention.

Finally, the present invention also encompasses a method for the installation and removal of the fixture and/or the lighting element. During installation, the fixture or the lighting element can first be introduced into the opening of the accommodating element in a direction parallel to the longitudinal axis, and then, after reaching the intended position, which may be defined, for example, by the projecting collar resting on the accommodating element and/or by having a stepped projection on the lateral wall, which in the installed state defines an axial abutment surface to the accommodating element, can be rotated to a stop. In this case, the latching element may be deflected by the accommodating element. When the final installed position is reached, the latching element can engage into the recess provided in the accommodating element, and reverse rotation against the installation direction of rotation is effectively prevented. The latching element is preferably in the form of a snap-in lug in order to reliably counteract unintended autonomous loosening and unlocking.

The locking may particularly favorably be accompanied by a locking noise, so that the operator receives an acoustic signal and thus an acoustic feedback so as to be informed about the completion of correct installation.

No tools are needed for the installation, since the latching element advantageously has a bevel in the installation direction of rotation, which causes a resilient deflection by the rotational movement and which allows engagement when reaching the final installed position. The deflection may advantageously be backwards, that is in the opposite direction as seen by the operator.

Advantageously, the lamp in the opening of the mounting element can be mounted so as to be rotatable and/or tiltable. Particularly favorably, the rotatable and/or tiltable mounting allows for use of the lighting element as a reading light.

Furthermore, the mounting of the lamp in rotatable and/or tiltable manner has the great advantage that for removal, access from the front, i.e. from the operator's side, to the latching element is very easily made possible, for example by turning the lamp to a stop and tilting it into an open position so as to expose part of the inner wall of the mounting element in this way. In this manner, a standard tool such as a screwdriver can be used, for example, to urge the latching element backwards to unlock it in this way. Once unlocked, the fixture or the lighting element can be rotated in opposite direction to the installation rotation, and the fixture or the lighting element can be removed from the opening of the accommodating element.

The fixture according to the invention and the lighting element have a number of advantages.

For example, easy installation and removal are possible from the front. This moreover proceeds very quickly, since during installation only one translational and one rotational movement are required, which can be performed in a single operation directly consecutively in a few seconds. Removal of the fixture according to the invention and of the lamp according to the invention is also simple and straightforward.

Furthermore, it is of great advantage that there is no purely frictional connection, but rather special value is placed on a particularly reliable positive connection that is effective in two directions. This makes it possible to specify comparatively high holding forces.

Thus, the fixture of the invention for a lamp and the lighting element based thereon satisfy the technical requirements in aviation, so that use thereof is in particular possible in the aviation sector, for example in the field of cabin interior lighting.

The interface for establishing the connection is very simple and cost-effective to manufacture. Only a simple contour is required in the opening of the accommodating element, which can be produced by milling, for example. Accordingly, the fixture itself may be produced in the form of a milled part, for example made of aluminum, or as a plastic injection-molded part, with the at least one rib and the latching element formed thereon.

It is moreover particularly advantageous that no loose parts or additional fastening elements such as screws are used, which might fall down or be lost during installation or removal.

Further details of the invention will become apparent from the description of the illustrated exemplary embodiments and the appended claims.

DETAILED DESCRIPTION

For the sake of clarity, the same reference numerals in the following detailed description of preferred embodiments indicate substantially similar parts in or on these embodiments. However, for better illustration of the invention, the preferred embodiments shown in the figures are not always drawn to scale.

Figure 1:
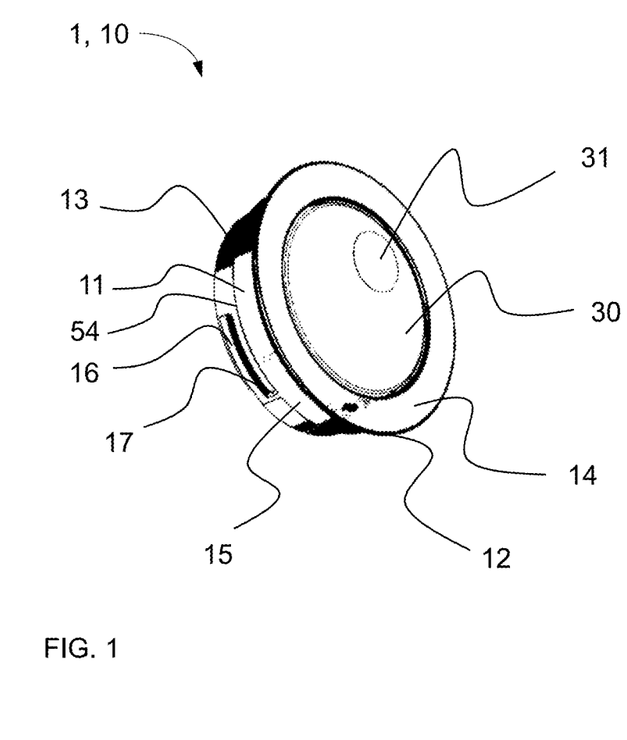
FIG. 1 is a perspective view of a lighting element according to the invention, comprising a fixture according to the invention and a lamp.

FIG. 1 is a perspective view of a lighting element 1 in a preferred embodiment comprising the fixture 10 according to the invention and a lamp 30. Lighting element 1 is designed as a reading lamp, without being limited to the illustrated exemplary embodiment.

Figure 2:
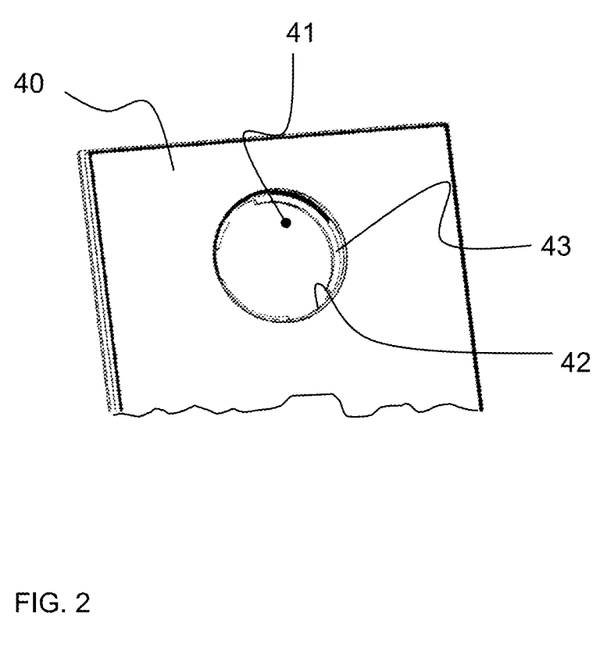
FIG. 2 shows a detail of an accommodating element having an opening for receiving the lighting element of the invention.

The fixture 10 is designed for being releasably fastened in an opening of an accommodating element 40 provided for this purpose, which is shown in FIG. 2, purely by way of example. FIG. 2 accordingly shows a detail of an accommodating element 40 having a circular opening 41 for receiving the lighting element 1.

Fixture 10 comprises a circular-cylindrical mounting element 11 having a lateral wall 15, a front side 12 and an opposite rear side 13. Mounting element 11 is in the form of a straight circular cylinder, and in the installed state the front side 12 faces the operator. Lamp 30 is firmly mounted in the opening of mounting element 11.

The front side comprises an opening for receiving the lamp 30. In the example shown, this opening is already equipped with the lamp 30 which is formed exactly complementary to the opening, that is to say it also has a basic shape similar to a straight circular cylinder. Lamp 30 fills the opening, and the inner wall of mounting element 11 is designed to retain the lamp 30.

In the example, the lamp 30 is mounted for rotation about the longitudinal axis of the lighting element 1, so that an operator can turn it about the central axis. For this purpose, a finger rest 31 is provided on the operating side of the lamp 30 in the example. In addition, the lamp 30 is pivotally mounted, that is it can be tilted about an axis perpendicular to the longitudinal axis of mounting element 11.

The lateral wall 15 of mounting element 11 comprises the fastening aids. According to the invention, the at least one radially outwardly projecting rib 16 and the radially outwardly projecting latching element 18 are provided on the outer surface of the lateral wall, which is not visible in this view.

For ease of installation, the lateral wall 15 is formed so as to slightly taper inwardly. However, this is not a necessary requirement. Slight axial clearance should, however, be provided between the outer perimeter of the lateral wall 15 and the opening of the accommodating element 40 in order to facilitate insertion.

Rib 16 is formed as part of the lateral wall 15 and has a stop 17 arranged so as to correspond to the final installed position, that is to the completed rotational position of the fixture in the opening functionally related to a stop in the opening of the accommodating element, so as to prevent over-rotation during installation.

The at least one rib 16 of the mounting element is effective similarly to a bayonet closure, so that rapid installation is provided, yet the connection is releasable non-destructively during removal.

The lateral wall 15 additionally has a partially or completely circumferential collar 14 on the front side, which is projecting radially beyond the outer wall.

In the illustrated exemplary embodiment, this collar 14 is formed so that it seals the accommodating element in its final installed state, so that in this way it can prevent ingress of foreign particles into the gap or into the cavity which is resulting between the circular opening of the accommodating element 40 and the outer wall of the mounting element 11 in the installed state. For sealing purposes, it is also possible to fixedly or detachably apply another material such as, for example, a preferably thin and/or flexible tape onto the side of the collar 14 facing the accommodating element 40 and/or into the opening 41, so that the ingress of small particles can be reliably prevented. To the operator's side, the collar 14 may be provided with design or decorative features, while the illustrated example shows a simple front side design without such features.

For particularly simple installation, a step-like circumferential projection is formed on the lateral wall 15, which defines a stop surface to the accommodating element 40 in the installed state. This step-like shoulder 54 of lateral wall 15 thus constitutes an axial stop. In this way it is possible to very easily define the final position upon axial insertion of the cylindrical mounting element 11 into the opening of accommodating element 40.

The opening 41 of the accommodating element 40, which is shown purely by way of example in FIG. 2, has recesses 42 formed on the inner perimeter thereof, whereby inwardly projecting lands 43 are defined, which allow the at least one rib 16 of fixture 10 to be received therebetween.

Figure 3:
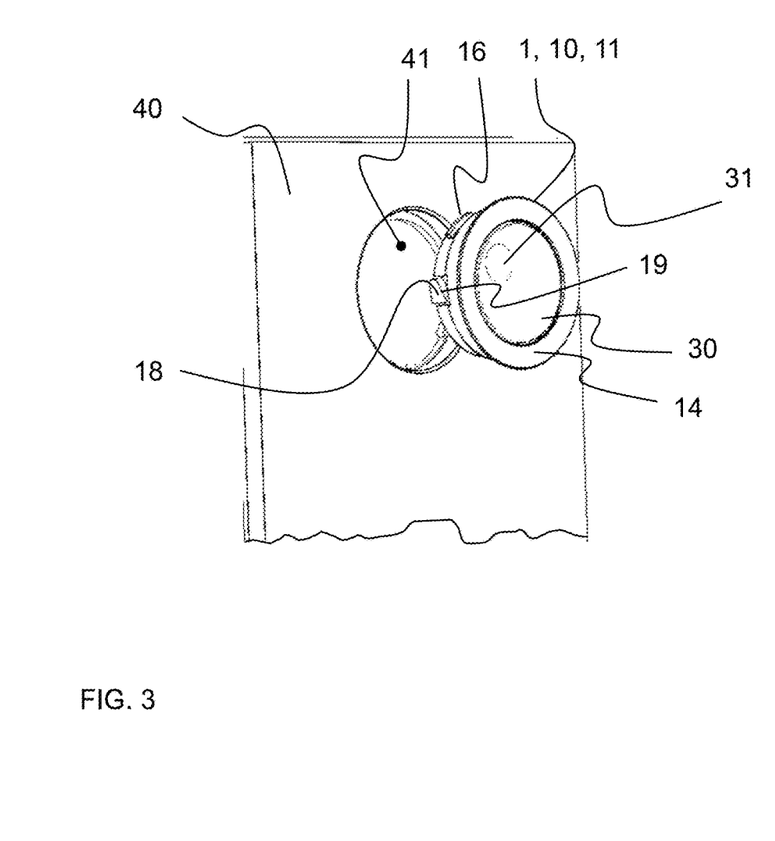
FIG. 3 shows a front side perspective view of a detail of an accommodating element and a lighting element before the start of installation.

FIG. 3 shows a front perspective view of a detail of an accommodating element 40 and a lighting element 10 before the start of installation. In the illustrated orientation of the lighting element relative to the opening 41 of accommodating element 40, the latching element 18 projecting radially from the outer wall is easily apparent. In this view, a rib 16 can also be seen.

The fixture 10 is inserted into the opening 41 of the accommodating element 40 in the intended orientation, in an axial movement. The end point of this axial movement is reached when the collar 14 comes to rest on the outer surface of accommodating element 40. In the present example, the collar 14 therefore constitutes an abutment or a limiting feature for the axial movement for the mounting of the fixture 10.

Figure 4:
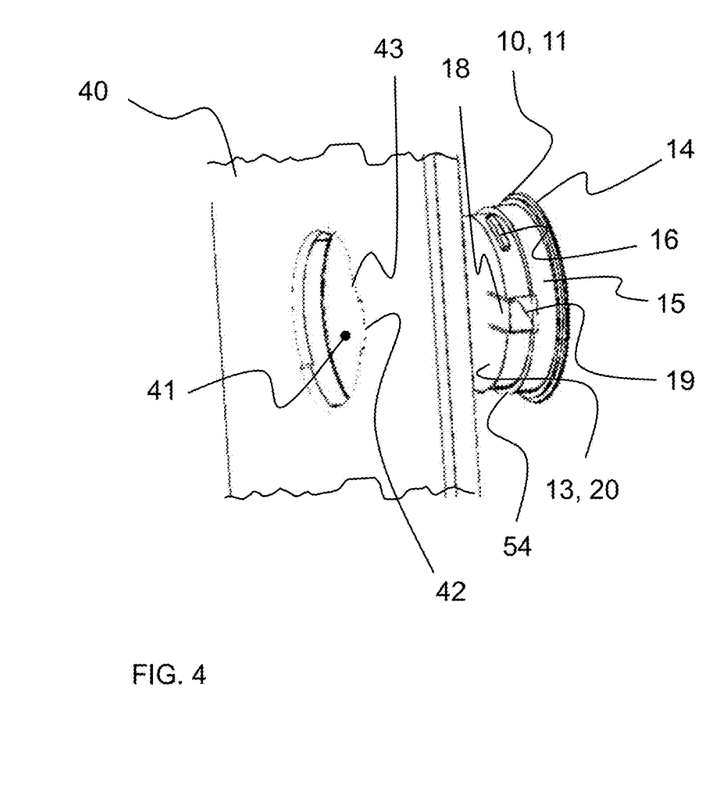
FIG. 4 is a rear side perspective view of a detail of an accommodating element and a lighting element before the start of installation.

FIG. 4 is a rear side perspective view showing a detail of an accommodating element and a lighting element before the start of installation. The mounting position corresponds to that shown in FIG. 3, only the viewing direction is opposite.

In this exemplary embodiment, the rear side 13 of mounting element 11 is formed with a closed rear wall 20. The latching element 18 is accordingly carved out of this rear wall 20. The bevel 19 of latching element 18 is well apparent from FIG. 4, which causes the latching element 18 to resiliently deflect in the installation direction of rotation and allows it to snap-in when reaching the final installed position.

The lateral wall 15 of mounting element 11 is formed with two different diameters, with the portion facing the rear side having a smaller diameter than the portion facing the front side, which also facilitates installation.

Figure 5:
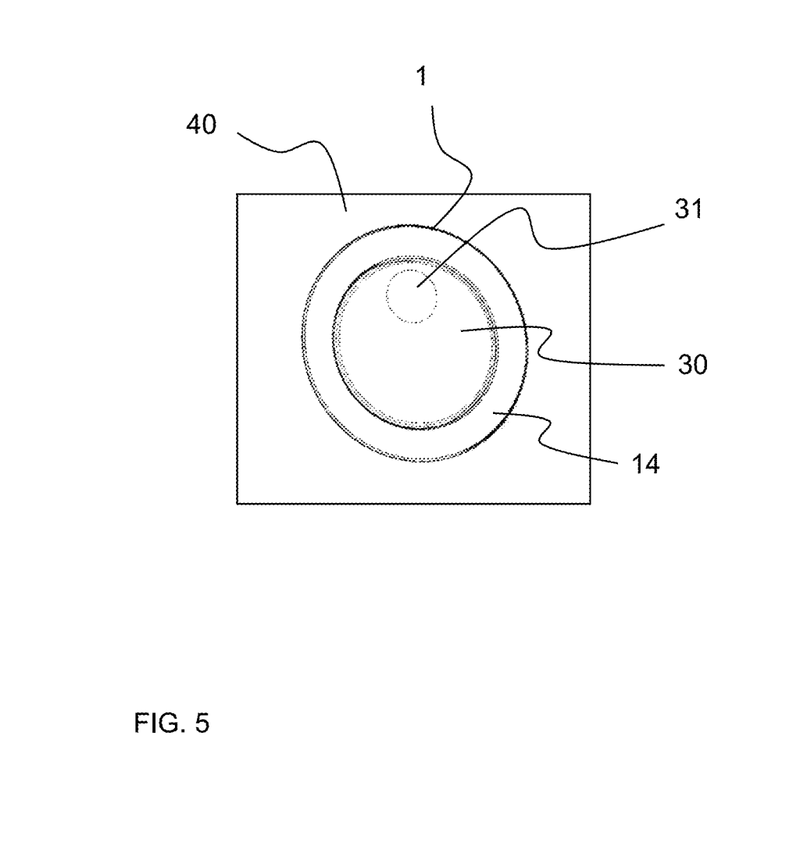
FIG. 5 is a front view of a mounted lighting element in an accommodating element.

FIG. 5 shows a front view of a mounted lighting element 1 in an accommodating element 40.

Figure 6:
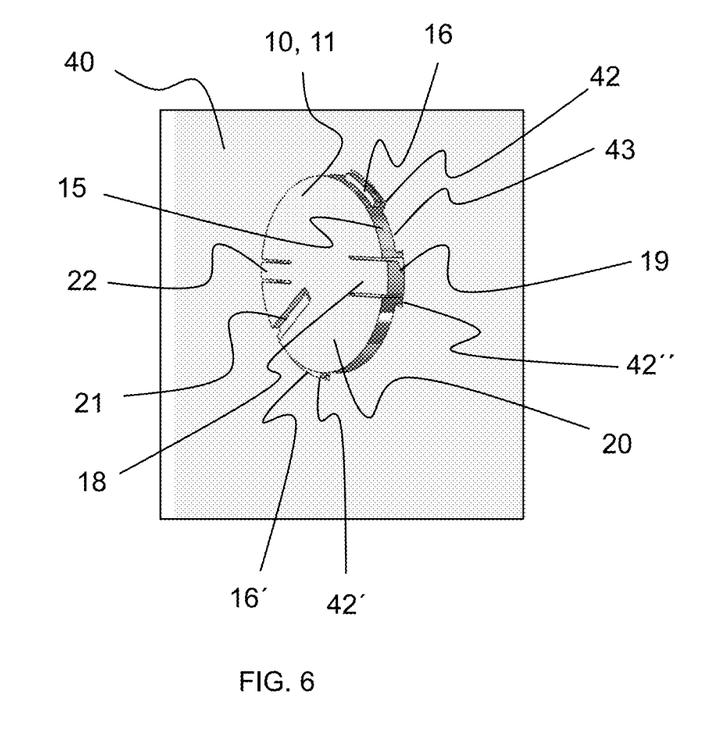
FIG. 6 is a rear side perspective view of a detail of an accommodating element and a mounting element after the start of installation in a position in which rotation has not yet occurred.

FIG. 6 shows a rear side perspective view of a detail of an accommodating element 40 and a mounting element 11 after the start of installation, in a position in which the insertion has already been accomplished, but the rotation after completed insertion has not yet been executed. Accordingly, mounting element 11 is shown in a position partially inserted in the opening of accommodating element 40.

In the illustrated embodiment, the outer surface of the lateral wall of mounting element 11 comprises two radially outwardly projecting ribs 16, 16' which are arranged so as to be tangentially spaced from each other to provide adequate reliability of the connection against accidental withdrawal. The two ribs are arranged on the outer surface of the lateral wall 15 opposite to each other, distributed over a circumferential section of more than 180 degrees. This arrangement of the two ribs 16, 16' diametrically opposite to each other on the outer surface promotes straight insertion of the fixture 10 into the opening 41 of the accommodating element, since jamming can be counteracted. Without being limited to the present exemplary embodiment, it is also possible that only one rib is provided, or more than two ribs, which are then arranged tangentially spaced from each other along the circumferential section.

In the present example, the ribs are arranged tangentially to the central axis of the fixture 10. However, it is also possible to form the ribs like a helix with a slight inclination, similar to a thread, so that a slight axial movement into the opening additionally occurs during the rotational movement.

In a further embodiment, at least one resilient tolerance rib is formed on the tangential ribs 16, which is capable of reducing the axial play to nearly zero after reaching the final position.

In the present example, the ribs are formed so as to have the same length. However, in the case of at least two ribs it is also possible to form at least two ribs with a different length to prevent insertion of the fixture 10 into the opening 41 in an unwanted orientation.

The recess 42 of accommodating element 40 shown in the example is designed such that the rib 16 can slide through when being inserted. Similarly, a second recess 42' is provided in the opening 41 for the second rib 16', where it can slide through when being inserted. Once insertion has been completed, a rotation causes the ribs 16, 16' to move behind the lands tangentially adjoining the recesses 42, 42', which provide an undercut preventing an axial movement of the fixture 10 out of the opening.

For this purpose, ribs 16, 16' are formed with a height of about 0.3 mm, in order to achieve a mechanically sufficiently strong connection. Generally, heights between 0.1 and 15 mm, preferably between 0.2 and 5 mm are favorable.

The length of the two ribs 16, 16', i.e. their tangential dimension relative to the central axis, is about 30° in the present example, which allows for a stable positively fitting connection.

It has proved to be advantageous if the ribs extend tangentially to the central axis over an angle between 5° and 65°, preferably between 10° and 60°, and most preferably between 15° and 50°. The overlapping range resulting therefrom in the installed state is generally sufficient, and the recesses 42, 42' required for mounting will not be too large in this case.

The bevel 19 of latching element 18, which is only partially visible in the view, causes the latching element to deflect in a rearward direction during a rotational movement in the intended direction after completed insertion, so that the latching element can slide over the land 43 of accommodating element 40 and can snap back into the recess 42 at the end of the rotatory movement. As a result, a rotational movement in a direction opposite to this mounting direction is counteracted, i.e. the latching element 18 prevents rotation of the fixture 10 back out of the final installed position.

Of course, it is also possible to provide more than one latching element. For example, two latching elements arranged opposite to each other may be provided. It must be considered, however, that a suitable release option should be provided therefor.

Latching element 18 is arranged on the outer surface of the lateral wall 15 in a circumferential section which has no rib. This separation of functions makes it possible to ensure simple installation on the one hand and a stable and reliable fit of the fixture in the opening in the installed state on the other hand. The tangential distance between rib 16 and latching element 18 is chosen in accordance with the spacing between recesses 42, 42'.

The illustrated mounting element 11 is formed with a mainly closed rear wall 20 which provides protection for the rear area of a lamp 30 supported in the mounting element 11. Not shown in the figure is a recess 21 provided for electrically connecting the lamp, through which a connection cable is extended laterally from outside. This cable is not shown in the figure up to a passage opening, and is extended through such passage opening in the rear wall to the lamp arranged inside.

For receiving and/or guiding the connection cable in or through the recess 21, the latter is dimensioned accordingly, and in the present example it has a depth and width of about 4 mm. Width and depth are designed such that the connection cable flushes with the rear wall 20, at least so that it does not protrude therebeyond. In the installed state, the recess 22 is facing downward, so that in the assembled state the cable is always routed in the same way, regardless of the direction of rotation.

The illustrated mounting element 11 is furthermore formed with a further resilient element 22 as a tolerance compensation feature against radial displacement. In the installed state, it is operatively related to the inner wall of the accommodating element 40 and is capable of counteracting radial play in this way, so that a tight fit of the lighting element 1 in the opening 41 is ensured. In the example, the resilient element 22 is arranged opposite to the latching element 18.

Figure 7:
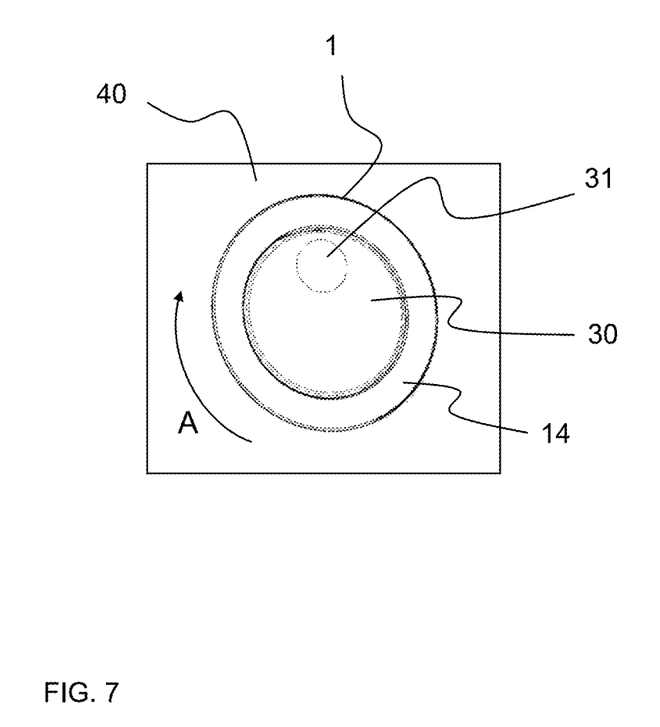
FIG. 7 is a front view of a lighting element inserted in the opening in an accommodating element.

FIG. 7 shows a front view of a lighting element 1 inserted in the opening in an accommodating element 40. Arrow A indicates the installation direction of rotation, in which the lighting element is rotated until reaching the final installed position.

Figure 8:
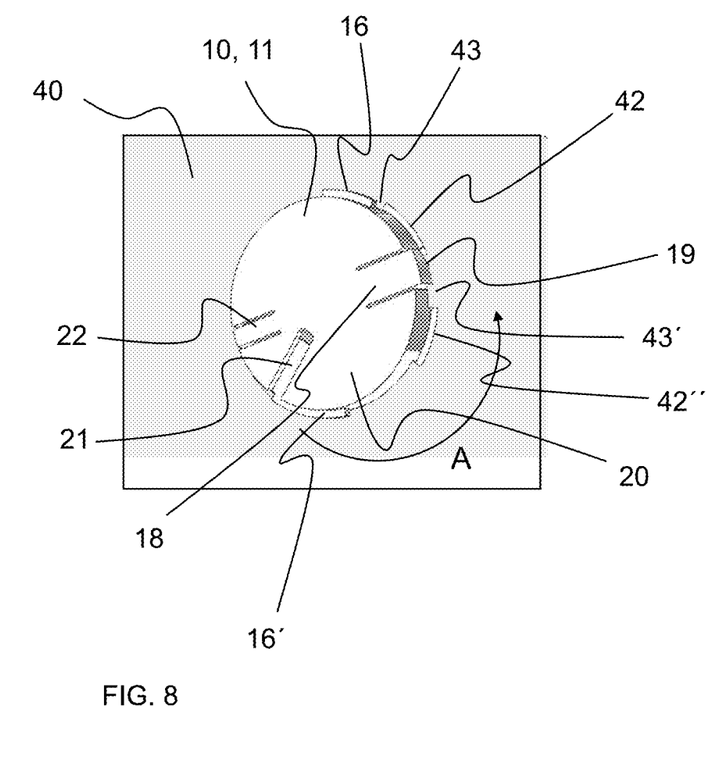
FIG. 8 is a rear side perspective view of a detail of an accommodating element and a mounting element after completion of insertion and in an orientation in which a partial rotation has already taken place in the installation direction of rotation.

FIG. 8 shows a rear side perspective view of a detail of an accommodating element 40 and a mounting element 11 after completion of insertion and in an orientation in which a partial rotation has already taken place in the installation direction of rotation. Arrow A indicates the installation direction of rotation, in which the lighting element is rotated until reaching the final installed position. Well apparent in this view is the rib 16, which has already been moved out of the recess 42 and now slides over the land 43 adjoining the recess of the accommodating element 40.

Figure 9:
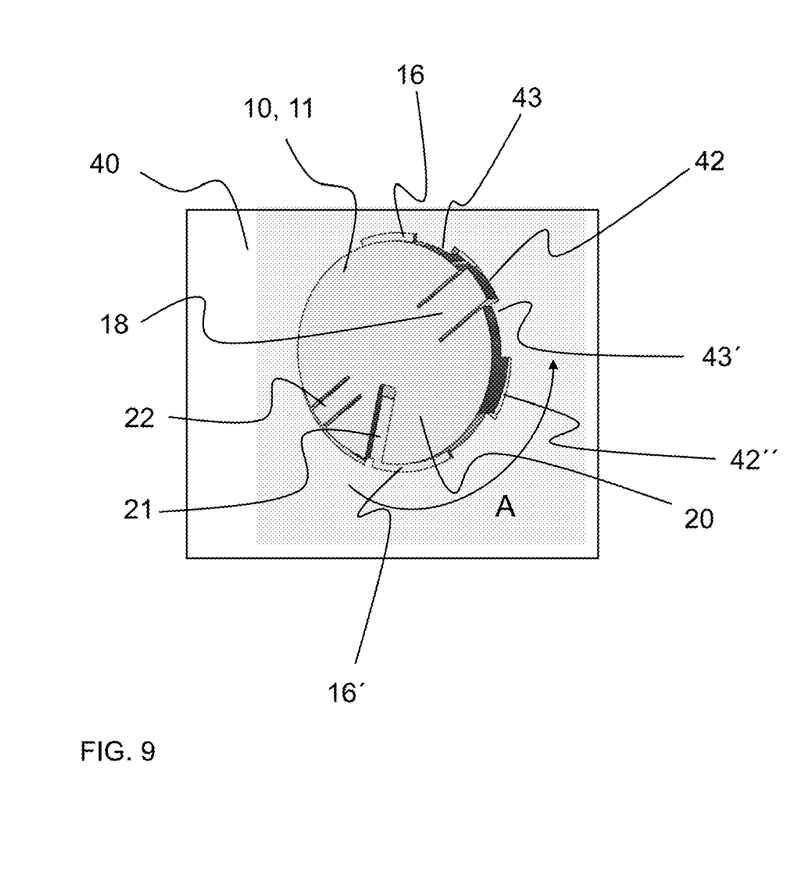
FIG. 9 is a rear side perspective view of a detail of an accommodating element and a mounting element in an orientation corresponding to the reaching of the final installed position.

FIG. 9 shows a rear side perspective view of a detail of an accommodating element 40 and a mounting element 11 in an orientation corresponding to the reaching of the final installed position. Thus, rotation in the installation direction of rotation A has been completed. It is well apparent that the latching element 18 is engaged in the recess 42 in this orientation, so that a positive fit is provided.

Figure 10:
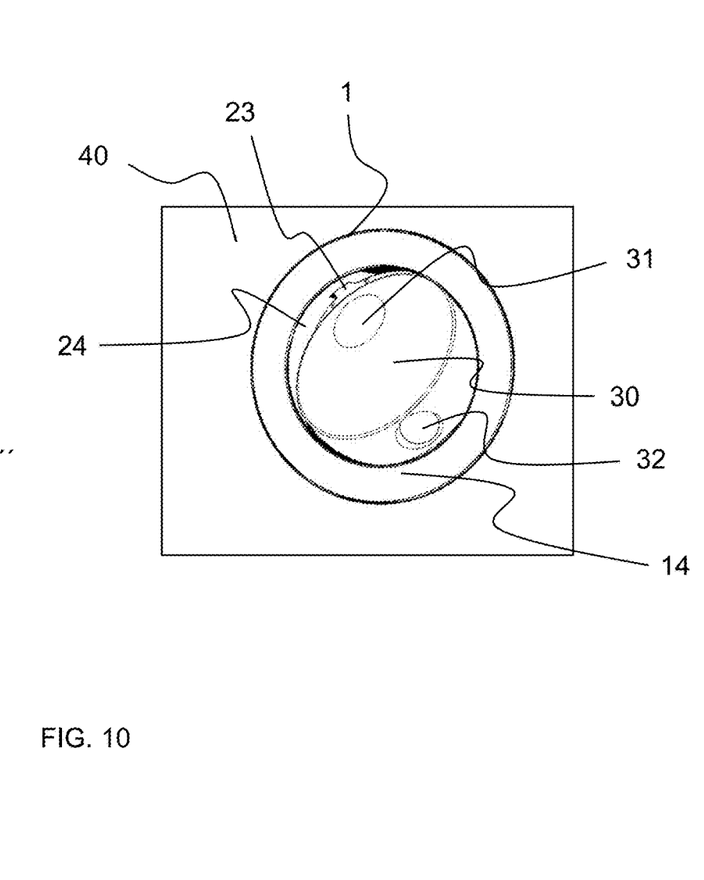
FIG. 10 shows a lighting element designed as a reading light which is mounted in an accommodating element.

FIG. 10 shows a lighting element 1 embodied as a reading light, which is mounted in an accommodating element 40. Lighting element 1 comprises a lamp 30 which is mounted in the opening of mounting element 11 so as to be tiltable and rotatable. The lamp 30 is equipped with a lighting means 32 which can emit light in a pivotally tilted position of the lamp 30. Turning and tilting of the lamp 30 allows to realize different light output angles. A light-emitting diode (LED) is provided as a light source, although other light sources may, of course, be used as well.

In the present exemplary embodiment, the direction of rotation of the lamp is limited on both sides, starting from a center position. In the example shown, the latching element 18 can be very easily accessed through an opening 23 to the inner wall 24, when the lamp 30 is rotated into a particular orientation and pivotally tilted.

Figure 11:
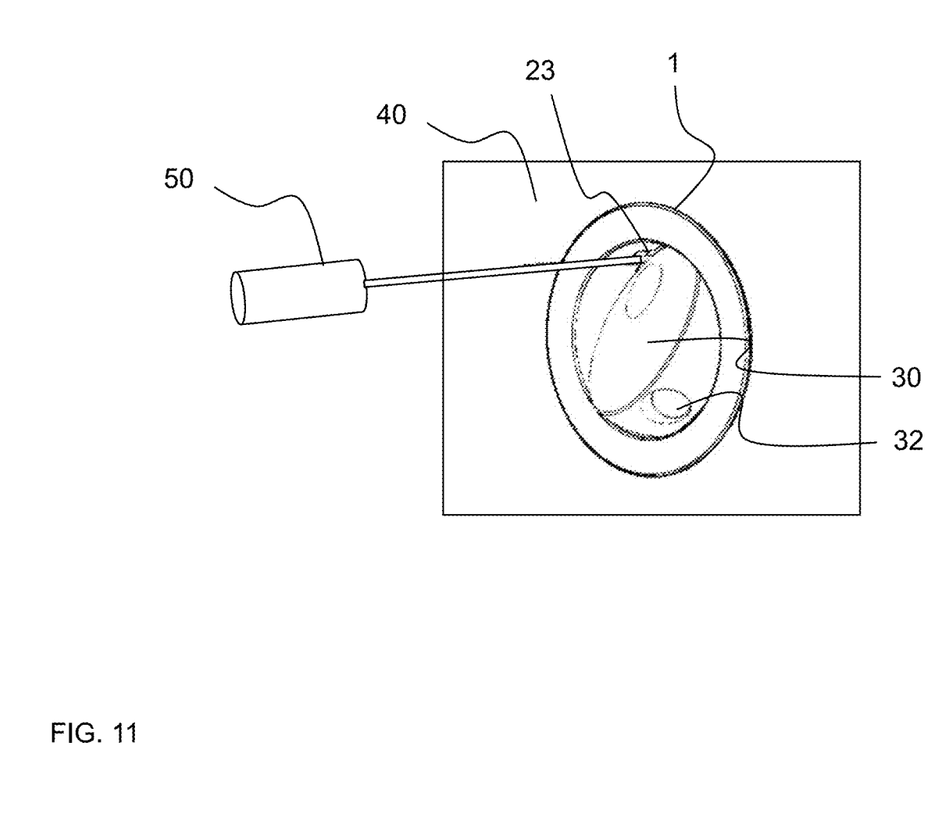
FIG. 11 is another front side view of a lighting element designed as a reading light which is mounted in an accommodating element.

Finally, FIG. 11 shows another front side view of a lighting element 1 designed as a reading light, which is mounted in an accommodating element 40. The latching element 18 can be unlocked from the front, i.e. from the operator's side, by means of a screwdriver 50 which is schematically illustrated purely by way of example, by exerting a force using the screwdriver 50.

For unlocking, for example for repair or maintenance works, the latching element 18 can thus be easily unlocked by applying a force to the latching element 18. The lighting element 1 of the invention is thus particularly easily and quickly installed and removed non-destructively.

The lighting element 1 of the invention furthermore has a very small dimension in the longitudinal direction, so that a very small installation depth is resulting. The lighting element 1 shown in the example has a dimension of approximately ¾ inch (1.9 cm) in the longitudinal direction and can therefore be installed directly in a headrest or neck support of an airliner passenger seat, to provide an individual reading light.

What is claimed is:

1. A fixture for receiving a lamp, the fixture being releasably mountable in an opening of an accommodating element, the fixture comprising:
   a cylindrical mounting element having a lateral wall, a front side, and an opposite rear side,
   wherein the front side has an opening configured to receive the lamp, the lateral wall has at a plurality of ribs that project radially outwards and extend tangentially to the cylindrical mounting element, and the lateral wall has a latching element that projects radially outwards, wherein the cylindrical mounting element further comprises a resilient element, wherein the resilient element is configured to provide a tolerance compensation against radial and/or axial displacement when the latching element is engaged, wherein the resilient element is at the rear side so as to be operatively related to the inner wall of the accommodating element, wherein the latching element deflects in a rearward direction during a rotational movement so that the latching element slides over a land of the accommodating element and can snap back into a recess of the accommodating element at an end of the rotational movement to counteract an opposite rotational movement, and
   wherein the cylindrical mounting element is configured to be installed and removed from the opening of the accommodating element without any screw or additional fastening element.

2. The fixture of claim 1, wherein the plurality of ribs are tangentially spaced from each other.

3. The fixture of claim 1, wherein the lateral wall has a collar at the front side of the cylindrical mounting element, and wherein the collar protrudes radially beyond an outer surface of the lateral wall.

4. The fixture of claim 1, wherein the plurality of ribs comprise two ribs that are distributed over a circumferential section of more than 180 degrees.

5. The fixture of claim 1, wherein the plurality of ribs have a largest dimension extending parallel to a section perpendicular to a central axis of the cylindrical mounting element.

6. The fixture of claim 1, wherein the plurality of ribs have an identical length.

7. The fixture of claim 1, wherein the plurality of ribs have a height between 0.1 and 15 mm measured relative to an outer surface of the lateral wall.

8. The fixture of claim 1, wherein the plurality of ribs extend to a central axis of the cylindrical mounting element over an angle between 5° and 65°.

9. The fixture of claim 1, wherein the latching element is in a portion of the lateral wall that has no rib.

10. The fixture of claim 1, wherein the latching element has a bevel, wherein the bevel causes the latching element to be deflected, during the rotational movement in an installation direction, until a final installed position is reached in which the latching element engages into the recess of the accommodating element.

11. The fixture of claim 10, wherein the latching element is configured to be unlocked by applying a force onto the latching element in a direction parallel to a central axis of the cylindrical mounting element.

12. The fixture of claim 1, wherein the cylindrical mounting element further comprises an opening on the rear side of the mounting element, the opening being configured to receive a connection element.

13. The fixture of claim 1, further comprising a maximum dimension along a central axis of the cylindrical mounting element of not more than 1 inch.

14. The fixture of claim 1, wherein the cylindrical mounting element is configured to be installed and/or removed from the opening of the accommodating element without tools and/or without a covering.

15. The fixture of claim 1, wherein the latching element is carved out of the rear side.

16. The fixture of claim 1, wherein the latching element is arranged on an outer surface of the lateral wall in a circumferential section which has no rib.

17. The fixture of claim 1, wherein the plurality of ribs have a different length.

18. A lighting element, comprising:
a lamp; and
a fixture including a cylindrical mounting element with a lateral wall, a front side, and an opposite rear side, wherein the front side has an opening configured to receive the lamp, the lateral wall has at a plurality of ribs that project radially outwards and extend tangentially to the cylindrical mounting element, and the lateral wall has a latching element that projects radially outwards, wherein the cylindrical mounting element further comprises a resilient element, wherein the resilient element is configured to provide a tolerance compensation against radial and/or axial displacement when the latching element is engaged, wherein the resilient element is operatively related to the inner wall of an accommodating element, wherein the latching element deflects in a rearward direction during a rotational movement so that the latching element slides over a land of the accommodating element and can snap back into a recess of the accommodating element at the end of the rotational movement to counteract an opposite rotational movement, and wherein the fixture is configured to be releasably mounted in an opening of the accommodating element by having the latching element being deflectable in a forward direction out of the recess by deflection a tool from the front side after turning and tilting the lamp with respect to the mounting element.

19. The lighting element of claim 18, wherein the accommodating element is selected from a group consisting of an automobile, an aviation craft, a train, a ship, an architecture structure, an interior lighting device, and an exterior lighting device.

* * * * *